US010928789B2

(12) United States Patent
Pothukuchi et al.

(10) Patent No.: US 10,928,789 B2
(45) Date of Patent: Feb. 23, 2021

(54) DISTRIBUTED MULTI-INPUT MULTI-OUTPUT CONTROL THEORETIC METHOD TO MANAGE HETEROGENEOUS SYSTEMS

(71) Applicant: Advanced Micro Devices, Inc., Santa Clara, CA (US)

(72) Inventors: Raghavendra Pradyumna Pothukuchi, Austin, TX (US); Joseph Lee Greathouse, Austin, TX (US); Leonardo De Paula Rosa Piga, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 86 days.

(21) Appl. No.: 15/950,172

(22) Filed: Apr. 11, 2018

(65) Prior Publication Data

US 2019/0317461 A1 Oct. 17, 2019

(51) Int. Cl.
*G05B 15/02* (2006.01)

(52) U.S. Cl.
CPC ................... *G05B 15/02* (2013.01)

(58) Field of Classification Search
CPC ....................................................... G05B 15/02
See application file for complete search history.

(56) References Cited

U.S. PATENT DOCUMENTS

| 2007/0072581 | A1* | 3/2007 | Aerrabotu | ......... | H04M 1/72541 |
| | | | | | 455/404.1 |
| 2011/0320636 | A1* | 12/2011 | Young | ................... | H04W 88/16 |
| | | | | | 709/249 |
| 2015/0169365 | A1* | 6/2015 | Gendler | ................... | G06F 1/324 |
| | | | | | 718/102 |
| 2018/0004452 | A1* | 1/2018 | Ganguli | ............. | H04L 43/0817 |

OTHER PUBLICATIONS

C. Imes, D. H. K. Kim, M. Maggio, H. Hoffman, "POET: A Portable Approach to Minimizing Energy Under Soft Real-time Constraints." RTAS, 2015.
H. Wang, V. Sathish, R. Singh, M. J. Schulte, N. S. Kim, "Workload and Power Budget Partitioning for Single-Chip Heterogeneous Processors." PACT, 2012.
I. Paul, V. Ravi, S. Manne, M. Arora, S. Yalamanchili, "Coordinated Energy Management in Heterogeneous Processors." SC, 2013.
I. Paul, W. Huang, M. Arora, S. Yalamanchili, "Harmonia: Balancing Compute and Memory Power in High-Performance GPUs." ISCA, 2015.

(Continued)

*Primary Examiner* — Robert A Cassity
(74) *Attorney, Agent, or Firm* — Liang & Cheng, PC (57) ABSTRACT

A processing unit includes a plurality of subsystem control modules. Each subsystem control module includes a set of one or more inputs that receives a set of one or more external signals and a set of one or more monitored outputs from a hardware subsystem corresponding to the subsystem control module, and a set of configuration outputs for controlling one or more configuration settings of the hardware subsystem. The subsystem control module determines the one or more configuration settings based on the set of monitored outputs and on one or more targets derived from the set of external signals.

21 Claims, 4 Drawing Sheets

(56) References Cited

OTHER PUBLICATIONS

K. Rao, S. Yalamanchili, Y. Wardi, J. Wang, H. Ye, "Application-Specific Performance-Aware Energy Optimization on Android Mobile Devices." HPCA, 2017.

M. Guevara, B. Lubin, B. C. Lee, "Navigating Heterogeneous Processors with Market Mechanisms." HPCA, 2013.

P. Bogdan, R. Marculescu, S. Jain, "Dynamic Power Management for Multidomain System-on-Chip Platforms: An Optimal Control Approach." Published in ACM Trans. on Design Automation of Electronic Systems, vol. 18, No. 4, Article 46. Oct. 2013.

Q. Deng, D. Meisner, A. Bhattacharjee, T. F. Wenisch, R. Bianchini, "CoScale: Coordinating CPU and Memory System DVFS in Server Systems." MICRO, 2012.

R. P. Pothukuchi, A. Ansari, P. Voulgaris, J. Torrellas, "Using Multiple Input, Multiple Output Formal Control to Maximize Resource Efficiency in Architectures." ISCA, 2016.

R. Raghavendra, P. Ranganathan, V. Talwar, Z. Wang, X. Zhu, "No 'Power' Struggles: Coordinated Multi-level Power Management for the Data Center." ASPLOS, 2008.

S. Fan, S. M. Zahedi, B. C. Lee, "The Computational Sprinting Game." ASPLOS, 2016.

X. Wang, "Intelligent Power Allocation: Maximize Performance in the Thermal Envelope" ARM White Paper, Mar. 2017.

Rahmani, Amir M., et al. "SPECTR: Formal Supervisory Control and Coordination for Many-core Systems Resource Management." Proceedings of the Twenty-Third International Conference on Architectural Support for Programming Languages and Operating Systems. ACM, 2018.

\* cited by examiner

DISTRIBUTED MULTI-INPUT MULTI-OUTPUT CONTROL THEORETIC METHOD TO MANAGE HETEROGENEOUS SYSTEMS

GOVERNMENT RIGHTS

This invention was made with Government support under PathForward Project with Lawrence Livermore National Security (Prime Contract No. DE-AC52-07NA27344, Subcontract No. B620717 awarded by DOE. The Government has certain rights in this invention.

BACKGROUND

Modern processing units, such as central processing units (CPUs), graphics processing units (GPUs), application specific integrated circuits (ASICs), etc. often include multiple intellectual property (IP) blocks, which each represent a modular block of logic or circuitry that can be connected with other IP blocks to create the complete processing unit. The multiple IP blocks in a single processing unit may be designed by different parties, and the designs may be the intellectual property of their respective parties.

These processing units and the computer systems in which they are implemented are carefully managed in order to maximize their performance, minimize energy usage, and meet myriad constraints such as power distribution limits. This management has traditionally been done in centralized controllers, which has led to difficulties when optimizing heterogeneous systems with many different localized goals (e.g., within individual IP blocks) along with system-wide goals that may conflict with the localized goals.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Heterogeneous processing units and systems (e.g., CPUs, GPUs, media controllers, I/O hubs, etc.) include diverse IP blocks for which different configuration settings (e.g., for adjusting operating frequency or voltage, dynamically enabling or disabling hardware units, power gating blocks, reducing active cache sizes, dynamically configuring the accuracy of floating point units, disabling optional stages in graphics pipelines, etc.) are controlled to optimize power consumption and performance. In some types of single-chip heterogeneous processors, the IP blocks are controlled from a centralized system management unit (SMU). These SMUs can be tasked with enforcing numerous protection mechanisms (e.g., chip-wide and IP block thermal constraints, dI/dt limits, voltage droop mitigation, etc.), in addition to performing a plethora of dynamic performance optimizations. For example, demand for an IP block can be estimated so that extra power can be supplied to the IP block or its operating frequency can be increased in order to optimize its runtime performance.

Accordingly, firmware for such centralized SMUs can be difficult and costly to design, since the design of a centralized SMU relies on knowledge of the performance and power characteristics for every IP block being managed by the SMU. Thus, an increasing number of heterogeneous IP blocks in a processing unit can lead to a corresponding increase in SMU complexity and design time. However, the implementation of complex dynamic control mechanisms can utilize a significant amount of computation, and is limited by the computing bandwidth of the SMU microcontroller. A single centralized SMU also has limited communication bandwidth, which could result in communication and decision delays when the SMU is tasked with controlling a large number of IP blocks.

In addition, some heterogeneous systems include multiple processing units (e.g., CPUs, GPUs, etc.), such that multiple SMUs coexist in a single system. Such arrangements may result when, for example, accelerators are added over expansion buses like PCIe, or devices in the system are assembled according to a chiplet-based approach in which separate IP blocks are laid down on a shared substrate. The multiple SMUs in the system will try to optimize their respective local devices; however, without a mechanism for facilitating cooperation between the SMUs, poor global optimization can result.

A centralized control theoretic mechanism as described above cannot be easily distributed across multiple devices because it lacks (i) native support for channels to communicate between multiple controllers and (ii) inherent robustness to uncertainty in a multi-controller environment. With regard to the former, ad hoc heuristics can be used to coordinate decisions between devices; however, this defeats the purpose of using systematically designed controllers. With respect to the latter, each controller in a multi-module environment should be able to function with only a partial view of the whole system; however, existing centralized control mechanisms do not offer robust control theoretic guarantees in such uncertain environments.

In one embodiment, a distributed processor controller is implemented by distributing control firmware across SMUs in various IP blocks to provide protection and optimization mechanisms for the hardware subsystems in the IP blocks. This arrangement better supports multiple diverse IP blocks in a heterogeneous system. The distributed processor controller uses robust multi-input multi-output (MIMO) control theory to reach optimal decisions, even in complex distributed designs with multiple controllers. Each hardware subsystem in the heterogeneous system has its own local controller; these controllers work together in a distributed fashion to optimize both local and system-wide targets.

In one embodiment, the controller primarily operates based on robust control theoretic principles so that the distributed design trends toward optimal decisions for reaching local and global targets. The controller additionally includes hard-coded controllers for responding to preconfigured scenarios and emergency conditions. These controllers allow the system to output preconfigured configuration settings for handling known scenarios and emergency conditions (e.g., the exceeding of hard limits) faster than can normally be handled by the MIMO control loop.

Since optimal settings for hardware subsystems are determined by their respective local controllers, no individual design team needs to know the optimization aspects of all hardware in the overall system. Instead, smaller teams can focus on optimizing each IP block separately. Another separate group of designers could design global controls for the system based on abstractions of the local controllers for each hardware subsystem. This further decreases firmware design complexity, cost, and lead-time. Communication between the controllers enables global optimizations to be performed for the overall system even though the local controllers are designed and built by entirely separate entities. In addition, the separate local control algorithms are executable on separate microcontrollers, and thus are not limited to the computing bandwidth of a single microcontroller.

Figure 1:
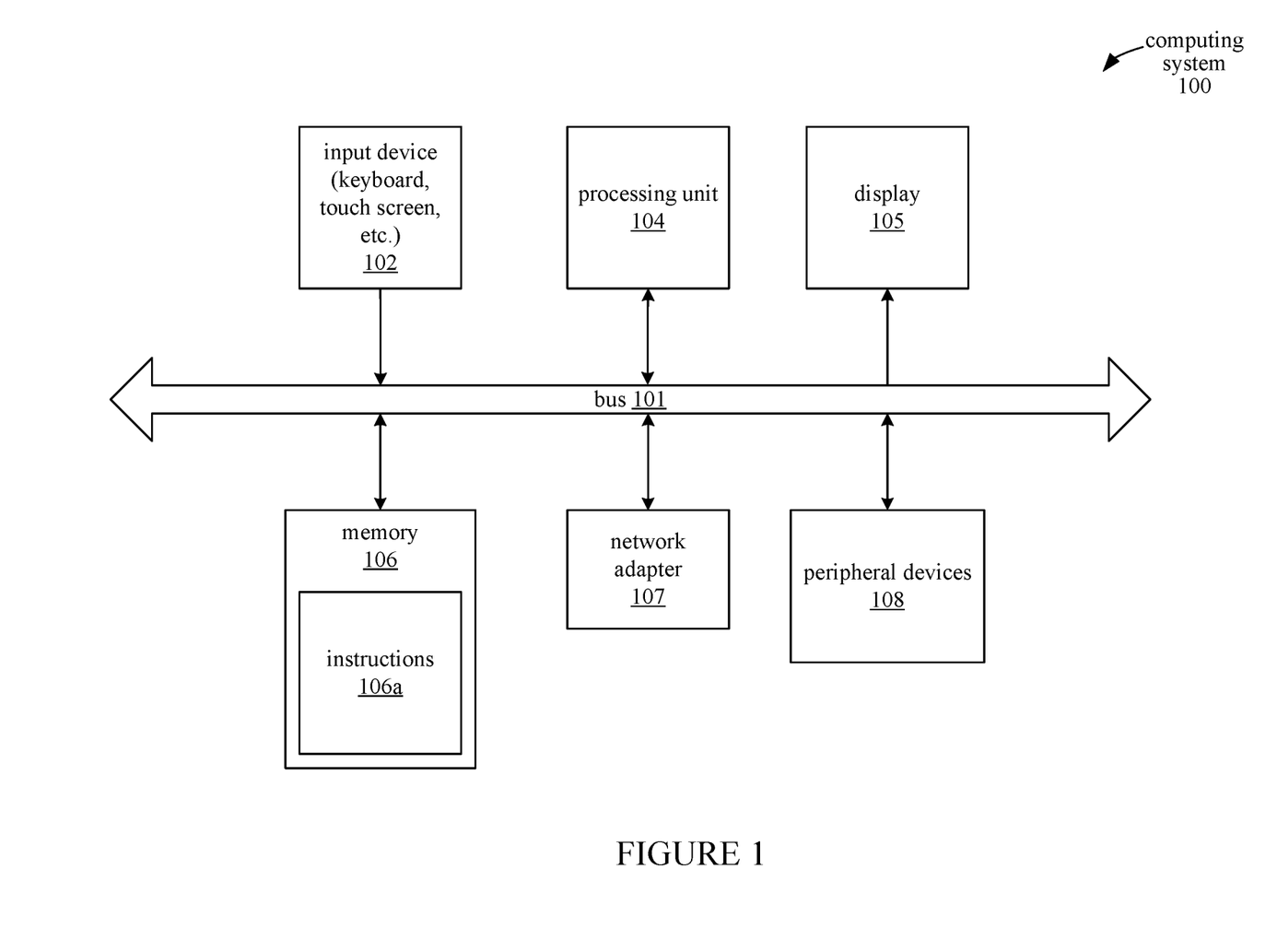
FIG. 1 illustrates an embodiment of a computing system that includes a processing unit.

FIG. 1 illustrates an embodiment of a computing system 100 in which a heterogeneous processing unit is implemented. In general, the computing system 100 may be embodied as any of a number of different types of devices, including but not limited to a laptop or desktop computer, mobile phone, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 are embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes a processing unit 104, which is a heterogeneous processing unit that includes multiple connected IP blocks, and is configured to receive and execute instructions 106a that are stored in the memory subsystem 106. In one embodiment, the IP blocks of the processing unit 104 reside on a common integrated circuit substrate, carrier board, printed circuit board, or other substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple processing units 104, network adapters 107, etc.

Figure 2:
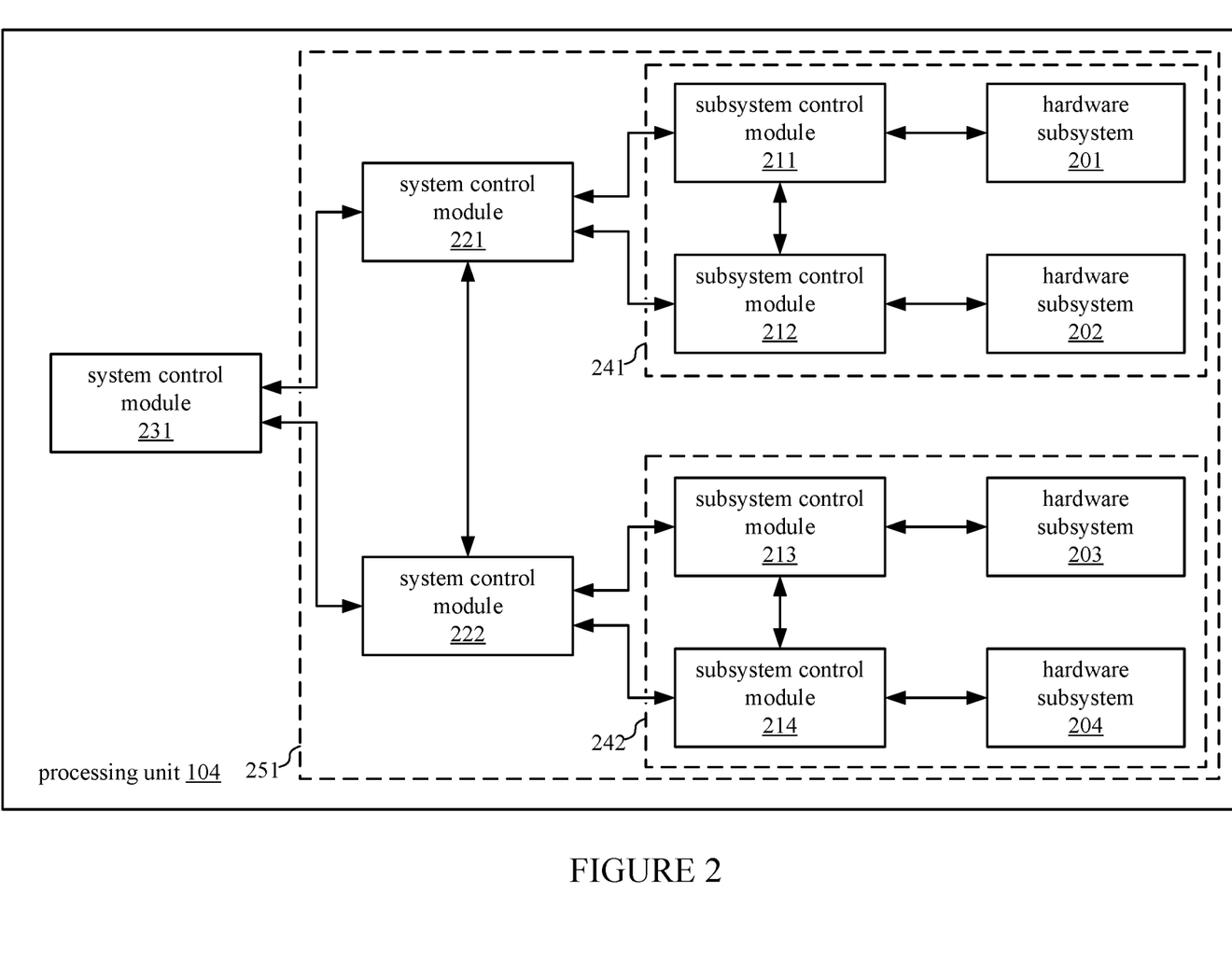
FIG. 2 illustrates a hierarchical distributed control system in a processing device, according to an embodiment.

FIG. 2 illustrates a hierarchical arrangement of distributed controllers in the processing unit 104, according to an embodiment. Processing unit 104 includes a set of interconnected multi-input multi-output (MIMO) controllers. The use of MIMO loops for controlling each hardware subsystem according to robust control theoretic principles provides strong guarantees that the system will converge on good configurations for each hardware subsystem for meeting one or more global and/or local targets, even if multiple configuration settings on the hardware subsystem (e.g. GPU frequency and GPU memory bandwidth) are changed in tandem to meet the targets. In one embodiment, a target represents a particular level close to which a monitored output should be maintained, or represents an objective (e.g., minimize energy, etc.).

The MIMO controllers are implemented as multiple individual control modules 211-231, which include system control modules 221, 222, and 231, and subsystem control modules 211-214. The subsystem control modules 211-214 are each coupled with a respective one of the hardware subsystems 201-204, and each subsystem control module 211-214 controls the configuration settings for its corresponding hardware subsystem. In one embodiment, each of the subsystem control modules 211-214 resides on the same integrated circuit substrate as its corresponding hardware subsystem 201-204, and resides on the same integrated circuit substrate as the other subsystem control modules. In alternative embodiments, some or all of the control modules 211-231 and some or all of the hardware subsystems 201-204 reside on different integrated circuit substrates but on a common interposer or carrier board, or reside on different interposers or carrier boards.

Each of the subsystem control modules 211-214 includes inputs for receiving a set of external signals and a set of monitored outputs from its corresponding hardware subsystem, which the subsystem control module is tasked with optimizing. The subsystem control module 211 thus reads from hardware subsystem 201 multiple monitored outputs each reflecting an operating parameter (e.g., thermal output, power consumption, etc.) to be optimized by the subsystem control module 211. In one embodiment, the monitored outputs are each associated with a global or local target, and subsystem control module 211 changes the configuration settings of hardware subsystem 201 to cause the monitored outputs to approach their corresponding targets. The subsystem control module 211 also reads additional measurements reflecting operating parameters of hardware subsystem 201 that are helpful in decision-making, but are not optimized (i.e., are not adjusted to reach any specified targets). For example, a CPU control module could be tasked with optimizing the monitored operating parameters of instruction throughput and power consumption, but may additionally measure the cache hit rate.

The subsystem control module 211 also receives external signals from other control modules, including other subsystem control modules 212-214 and/or system control modules 221, 222, and 231. The signals from other control modules enable the subsystem control module 211 to coordinate with other control modules to meet targets (e.g., global targets) imposed for multiple hardware subsystems (as opposed to local targets for only the hardware subsystem 201). The external signals received at subsystem control module 211 include configurable inputs, monitored outputs, or additional measurements that are sent by the subsystem control modules (e.g., 212-214) of a different hardware subsystem or by system controllers (e.g., 221, 222, 231) at a wider scope. The external signals also include global targets for the monitored outputs of the hardware subsystem 201. For example, in a system with a CPU subsystem and a discrete GPU subsystem, the CPU subsystem control module receives the GPU power consumption as an external signal from the GPU subsystem and an updated global power target from a superior system control module. Based on these signals, the CPU subsystem control module optimizes its local CPU configuration to reach the global target in coordination with the GPU subsystem. The external signals also include power budgets and/or performance targets that a superior control system assigns to the subordinate controllers. The subordinate controllers synthesize local targets for power or performance under such budgets.

Each of the subsystem control modules 211 also includes a set of configuration outputs for controlling the configuration settings of their respective hardware subsystems. For example, the subsystem control module 211 determines a set of configuration settings for the hardware subsystem 201 for meeting global and local targets, then transmits the configuration settings to the hardware subsystem 201 via the configuration outputs to reconfigure the hardware subsystem 201. The other subsystem control modules 212-214 operate in similar fashion as subsystem control module 211 with respect to their own corresponding hardware subsystems 202-204.

Each of the hardware subsystems 201-204 receives configuration settings from its respective subsystem control module 211-214 and operates according to the received configuration settings. The configuration settings control operating parameters of the hardware subsystems 201-204, such as operating frequency, operating voltage, power state, etc. Each of the hardware subsystems 201-204 also provides the monitored outputs and additional measurements to their respective subsystem control modules 211-214. The monitored outputs and additional measurements indicate parameters such as temperature, instruction throughput, power state, etc. of the hardware subsystems, and/or any other operating information considered important in the computer system.

The processing unit 104 also includes a number of system control modules 221, 222, and 231. The system control modules 221 control configurations for groups of subsystems; for example, the system control module 221 controls the configuration of group 241, which includes hardware subsystems 201 and 202 and their corresponding control modules 211 and 212. Similarly, system control module 222 controls the configuration of group 242, which includes hardware subsystems 203 and 204 and their corresponding control modules 213 and 214. System control module 231 controls the configuration of group 251, which includes groups 241 and 242 and their respective control modules 221 and 222.

In one embodiment, each of the groups 241, 242, and 251 functions with respect to its corresponding system control module 221, 222, and 231 in similar fashion as a hardware subsystem functions with respect to its subsystem control module. In one embodiment, each of the illustrated hardware subsystems 201-204 represents groups of smaller hardware subsystems and their corresponding control modules. The control modules 211-231 and hardware subsystems 201-204 are thus interconnected in a hierarchical topology, where subordinate hardware subsystems or control modules are controlled by their superior control modules. For example, hardware subsystem 201 is subordinate to subsystem control module 211, and components in group 241 are subordinate to system control module 221. In alternative embodiments, the hierarchical control system is extended to include an arbitrary number of hardware subsystems, subsystem control modules, and system control modules in the hierarchical topology.

With the multiple controllers interconnected in a hierarchical topology, a superior system control module 231 is able to propagate system-wide global targets (e.g., a system power budget) to all of its subordinate control modules and subsystems, while local targets and optimizations (e.g., management of GPU performance) are handled by the subordinate subsystem control modules without comprehensive involvement by the superior system control module 231. Thus, each subsystem's optimization mechanism is largely self-contained.

In the hierarchical topology, external signals are propagated down the hierarchy from superior control modules to subordinate control modules. Thus, each of the system control modules 221, 222, and 231 transmits a set of one or more external signals (e.g., global targets and/or monitored outputs) to a subordinate system control module, and/or one of the subsystem control modules 211-214. In the hierarchical topology, some monitored outputs are propagated up the hierarchy from the hardware subsystems 201-204 at which they are measured. For example, the subsystem control module 211 reads a set of monitored outputs from the hardware subsystem 201 and transmits one or more of the monitored outputs to a superior system control module 221, or to system control module 231 via system control module 221.

In addition, some signals are passed laterally between subsystem control modules that are at the same level in the hierarchy or within the same group (e.g., subsystem control modules 211 and 212). Signals transmitted from subsystem control module 212 to control module 211 indicate operational parameters (e.g., monitored outputs or additional measurements), or local targets of hardware subsystem 202. In some cases, the operational parameters of hardware subsystem 202 affect the operation of hardware subsystem 201. For example, a signal representing the memory frequency of a memory subsystem is transmitted to a GPU control module or a GPU subsystem because changes in the memory frequency affect the performance of the GPU subsystem, as observed by the GPU control module. Laterally transmitted signals are also used to indicate local targets to other subsystem control modules so that they can cooperate to reach the local targets.

Accordingly, the subsystem control module 211 in one embodiment calculates configuration settings for hardware subsystem 201 based on the signals received from subsystem control module 212. The configuration settings of the hardware subsystem 201 are changed to affect the operation of hardware subsystem 202 (as indicated by the received signals), or the calculation of new configuration settings for hardware subsystem 201 by the subsystem control module 211 accounts for the effects of hardware subsystem 202's operational parameters (as indicated by the transmitted signals) on hardware subsystem 201. Signals representing the operating parameters of hardware subsystem 201 are similarly transmitted from the subsystem control module 211 to the subsystem control module 212 to be used as a basis for calculating a set of configuration settings for hardware subsystem 202. As illustrated in FIG. 2, similar signals are also transmitted between subsystem control modules 213 and 214, and between system control modules 221 and 222, and are also used by these modules when calculating new configuration settings.

In one embodiment, two subsystem control modules pass signals to each other via a system control module that is superior to both of the subsystem control modules. For example, the subsystem control module 211 passes signals to the superior system control module 221, which in turn passes the signals to subsystem control module 212. Subsystem control module 212 similarly passes signals to the subsystem control module 211 via system control module 221.

In one embodiment, the control system including the subsystem control modules 211-231 is designed according to robust control theoretic principles so that the control modules 211-213 coordinate their configuration decisions to approach an optimal hardware configuration for the application being executed in the processing unit 104. This approach simplifies design efforts and achieves optimal results dynamically. A control system correctly designed according to the principles of Robust Control Theory can guarantee that: 1) the control system will be stable and will not wildly oscillate or be stuck at the extremes of possible configurations; 2) the control system will converge on a solution that meets the targets if such a solution exists; 3) the control system makes optimal configuration decisions according to a designer-specified cost function; and 4) the control system is robust and can maintain the above guarantees in the presence of uncertainty arising from other controllers' actions, unmodeled behavior, imperfect system characterization, application and system variations, etc.

Figure 3:
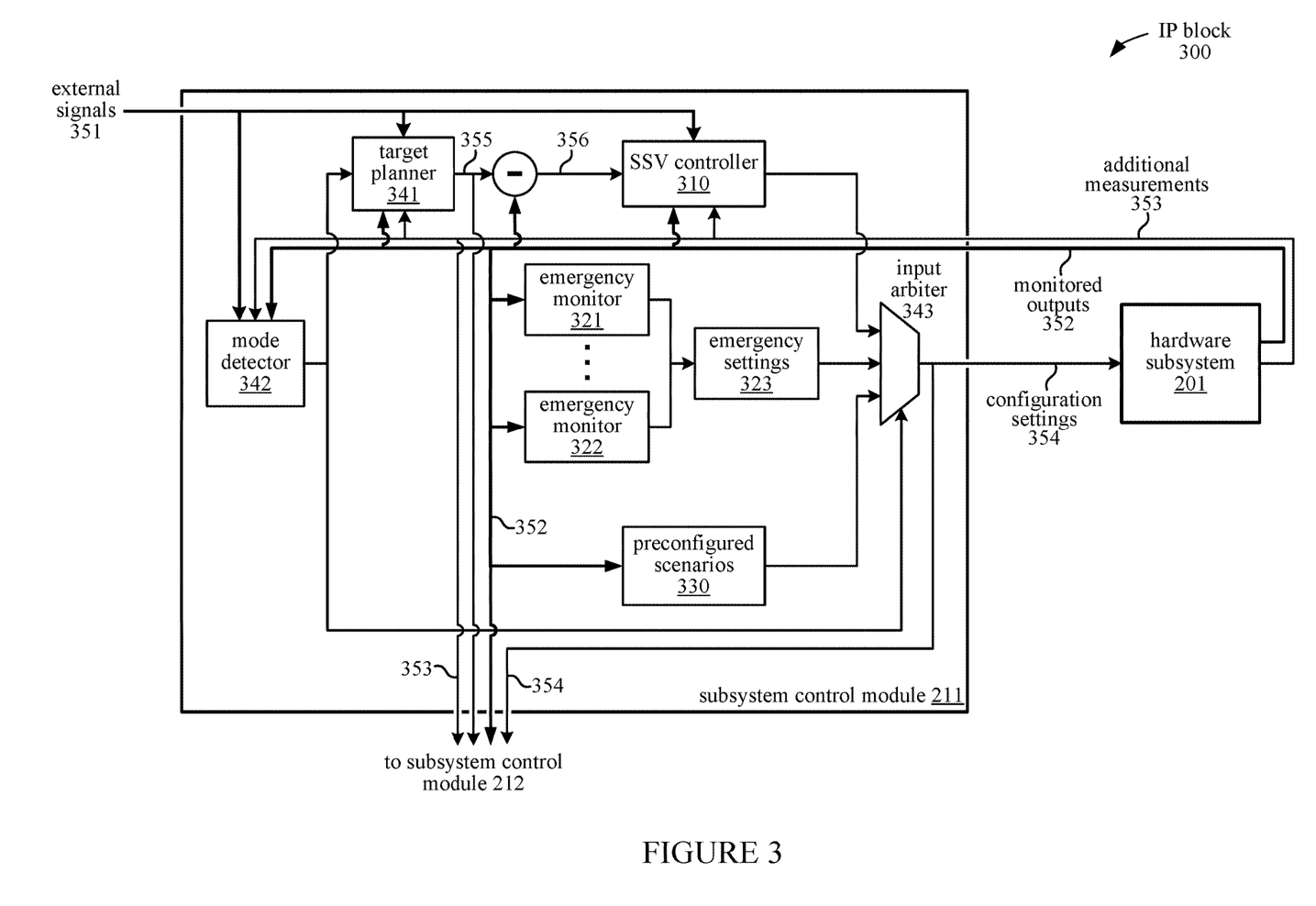
FIG. 3 illustrates an embodiment of a subsystem control module, according to an embodiment.

FIG. 3 illustrates the circuit modules in one embodiment of an IP block 300 that includes the subsystem control module 211 and the hardware subsystem 201. In one embodiment, the subsystem control module 211 is implemented in firmware for the hardware subsystem 201; alternatively, the subsystem control module 211 resides on a dedicated controller block connected with the hardware subsystem 201. The subsystem control module 211 is a multiple-input, multiple-output (MIMO) controller that receives multiple inputs (e.g., external signals 351, monitored outputs 352, and additional measurements 353) and calculates multiple outputs (e.g., configuration settings 354) based on the multiple inputs.

In the subsystem control module 211, the mode detector 342 detects a mode of operation of the hardware subsystem 201 and, via input arbiter 343, selects a set of configuration settings 354 for configuring hardware subsystem 201 based on the detected mode of operation. The mode detector 342 identifies the mode of operation based on a number of signals, including the monitored outputs 352, additional measurements 353, and external signals 351, which includes global targets, local targets of other subsystems, and/or measurements of operating parameters for other subsystems. Based on these signals, the mode detector 342 identifies the mode of operation. In one embodiment in which the IP block 300 is implemented in a computer, different modes of operation are identified for different use cases for the computer (e.g., idle, gaming, etc.) that utilize the resources of the processing unit 104 differently. The mode detector 342 identifies the mode of operation by matching the received signal with a pattern of signals corresponding to the mode of operation. In this manner, the mode detector 342 determines whether any emergency limits have been exceeded, or whether the execution in the hardware subsystem 201 resembles a preconfigured scenario. In one embodiment, the mode detector 342 refines its own scheme for classifying the different modes of operation based on the system's response to previously identified modes of operation.

An input arbiter 343 coupled with the mode detector 342 selects a set of configuration settings 354 from multiple sets of configuration settings in response to the mode of operation identified by the mode detector 342. If the identified mode of operation is an emergency condition (i.e., one or more emergency limits have been exceeded), the input arbiter 343 selects a set of emergency configuration settings provided by the emergency settings module 323. Otherwise, if the identified mode of operation is one of a set of enumerated preconfigured scenarios, then the input arbiter 343 selects a set of configuration settings from the preconfigured scenarios module 330. If no emergency condition is detected and no predetermined mode of operation is detected, the input arbiter 343 selects a calculated set of configuration settings 354 for configuring the hardware subsystem 201.

The subsystem control module 211 provides an emergency monitoring mechanism that allows high-priority hard limits to be programmed and monitored for quickly reacting to safety-critical issues. For instance, if the hardware subsystem 201 (or the processing unit 104 or system 100) exceeds a safety-critical threshold (e.g., a thermal or current threshold), the emergency settings module 323 assumes control of the configuration to prevent damage to the hardware subsystem 201.

A set of emergency monitors 321-322 detects whether any of the high-priority limits have been exceeded (e.g., exceeding a thermal limit) and determines a set of emergency configuration settings appropriate for correcting the emergency condition. In one embodiment, each of the emergency monitors 321-322 monitors one of the monitored outputs 352 and asserts its output if the monitored output 352 is outside a predetermined acceptable range. The emergency settings module 323 responds to an emergency condition, as indicated by the one or more monitored outputs 352, by providing a set of emergency configuration settings to the input arbiter 343.

The emergency settings module 323 provides different sets of emergency configuration settings depending on the limit or combination of limits that are exceeded, as indicated by the emergency monitors 321-322. For example, the emergency settings module 323 may provide a first set of emergency configuration settings to throttle the operating frequency of the hardware subsystem 201 when a thermal limit is exceeded, and a different second set of emergency configuration settings to shut down the hardware subsystem 201 when a current limit is exceeded. The selected set of emergency configuration settings is provided to the input of the input arbiter 343. The input arbiter 343 selects the provided set of emergency configuration settings when the emergency condition is indicated by the monitored outputs 352.

The subsystem control module 211 includes the preconfigured scenarios module 330 so that configuration settings for known modes of operation can be quickly identified and applied. In one embodiment, the configuration settings for a recognized predetermined scenario can be determined and applied faster than the system can calculate a new set of configuration settings.

For example, a subsystem control module designed to calculate configuration settings for multicore execution in a hardware subsystem with multiple processing cores could fail to quickly produce an optimal set of configuration settings when only a single thread is being executed. In this case, an obvious good configuration is to execute the thread in a single core and run the core at maximum frequency.

Thus, the preconfigured scenarios module 330 allows designers to enumerate such scenarios along with known good configurations for operating the hardware subsystem in the enumerated scenarios. For each of the enumerated scenarios, the designer specifies a particular pattern of the monitored outputs 352, additional measurements 353, etc. that are used to identify the scenario. The designer also specifies the set of configuration settings for the scenario. During operation of the hardware subsystem 201, the preconfigured scenarios module 330 identifies a scenario based on the pattern of signals, determines which set of configuration settings corresponds to the identified scenario, and provides the configuration settings to the input arbiter 343. The mode detector 342 determines that one of the preconfigured scenarios has been detected and causes the input arbiter 343 to select the configuration settings provided by the preconfigured scenarios module 330.

If no emergency condition or preconfigured scenario is detected, the mode detector 342 causes the input arbiter 343 to select a set of configuration settings 354 from the structured singular value (SSV) controller 310. The SSV controller 310 receives a set of local targets from the target planner module 341, then calculates a set of configuration settings for the hardware subsystem 201 to cause the monitored outputs 352 to approach the local targets.

The target planner 341 issues good local targets 355 for achieving the global targets received from superior system control modules. In one embodiment, the target planner 341 receives one or more global targets (e.g., power, performance, and thermal targets) as external signals 351 and refines the targets based on the execution of hardware subsystem 201 (as indicated by the monitored outputs 352 and additional measurements 353) and/or other hardware subsystems (as indicated from the external signals 351). The mode of operation of the hardware subsystem 201 can also affect the targets 355; accordingly, the target planning is also performed based on information from the mode detector 342. In particular, the mode of operation detected by the mode detector 342 is indicated to the target planner 341, and the target planner 341 adjusts its targets 355 based on the detected mode of operation. From the mode detector 342, the target planner 341 also receives information about the execution taking place in hardware subsystem 201, such as the amount of parallelism in the execution, any maximum limits for the monitored outputs 352, etc.

In one embodiment, the number of global targets received by the subsystem control module 211 is fewer than the number of local targets derived by the target planner module 341. For example, when a superior system control module 221 provides a global target (e.g., indicating a power consumption limit) to the subsystem control module 211, target planner module 341 responds by generating multiple local targets (e.g., limits for voltage, frequency, etc.) to achieve the global target with respect to the hardware subsystem 201. Thus, the superior system control modules need not control all of the configuration settings of lower-level hardware subsystems; instead, the specific details of how the global targets are reached are handled by the hardware subsystems' own control modules.

The SSV controller 310 attempts to find a configuration for the hardware subsystem 201 that meets the targets 355 issued from the target planner 341. The SSV controller 310 monitors the set of monitored outputs 352 and generates optimal configurations for the hardware subsystem 201 to keep the monitored outputs 352 close to their corresponding targets 355 as provided by the target planner module 341.

In one embodiment, the configuration settings 354 are determined based on a function of the set of monitored outputs 352 and one or more of the local targets 355, where the local targets 355 are generated by the target planner 341 based on the external signals 351 and local measurements (e.g., monitored outputs 352 and/or additional measurements 353). In particular, the configuration settings 354 are calculated based on deviations 356 between each of the monitored outputs 352 and their respective targets that are received at the SSV controller 310. In an alternative embodiment, the SSV controller 310 reads the local targets 355 and the values for their corresponding monitored outputs 352 directly instead of reading the deviations 356.

In the SSV controller 310, configuration settings 354 are generated based on an internal state of the SSV controller 310. The internal state of the SSV controller 310 evolves based on the past state of the SSV controller 310 and the measurements (e.g., 352 and 353) received by the SSV controller 310. Thus, the operation of the SSV controller is described using Equations 1 and 2:

$$\text{State}(T+1) = A \times \text{State}(T) + B \times \text{Measurements}(T) \qquad \text{Equation 1}$$

$$\text{Settings}(T) = C \times \text{State}(T) + D \times \text{Measurements}(T) \qquad \text{Equation 2}$$

In Equations 1 and 2, T represents a current decision interval, and T+1 refers to the next subsequent decision interval. In Equations 1 and 2, 'State(T)', 'Settings(T)', and 'Measurements(T)' are vectors representing the internal state of the SSV controller 310, the configuration settings 354, and the measurements (e.g., monitored outputs 352, additional measurements 353, targets 355, and/or external signals 351), respectively, at time T. The A, B, C, and D matrices are produced from the controller design process, and define the controller's behavior and its guarantees.

The SSV controller 310 is designed according to a designer-specified cost function, in which greater deviations from the target values contribute to a higher cost. In the cost function, the monitored outputs may be weighted differently and thus contribute to the cost in different proportions. In addition to output deviations, the cost function also includes weighted overheads for changing each input, and uncertainty guardbands indicating the maximum uncertainty that the controller can tolerate in keeping the output deviations within the guaranteed bounds. The controller design process determines SSV matrices A, B, C, and D that minimize the cost function; specifically, the matrices A, B, C, and D are obtained by minimizing what is known as the structured singular value of the closed loop system that includes the SSV controller 310 and the controlled system (e.g., hardware subsystem 201 and other affected subsystems), under uncertainty. Thus, the configuration settings 354 generated using these matrices A, B, C, and D are considered optimal by design. In the design of the SSV controller 310, different types of uncertainties and imprecisions are explicitly considered in obtaining the matrices A, B, C, and D. As a result, the SSV controller 310 performs robustly under bounded uncertainty.

In operation, the SSV controller 310 determines the configuration settings 354 by evaluating the Equations 1 and 2. The initial state (i.e. State(0)) is initialized to 0, a random value, or some preconfigured value. In one embodiment, the settings 354 produced by the SSV controller 310 are rounded to the closest actually available values in the system. For example, a frequency of 3.67 GHz determined by the controller as one of the configuration settings 354 is rounded to 3.6 GHz in a system where 3.6 GHz is the nearest value at which the frequency can be set. The effects of the emergency settings module 323 and the preconfigured scenario module 330 are accounted for in the SSV controller 310 design process and the SSV controller 310 is able to provide robust control theoretic guarantees for the entire control system that includes these ad hoc components.

In some embodiments, the SSV controller 310 also reads additional measurements 353 and/or signals from other subsystem control modules, and the calculation of the configuration settings 354 is also based on these signals. Accordingly, the subsystem control module 211 also transmits signals to the SSV controllers of other subsystem control modules. For example, the monitored outputs 352, additional measurements 353, and local targets 355 are transmitted from subsystem control module 211 to subsystem control module 212. In one embodiment, some or all of these signals are also transmitted to a superior system control module (e.g., system control module 221). The communication of operational parameters and targets between control modules allows the configuration decisions effected by other subsystems (and the data that informed and resulted from those decisions) to be taken into account directly by other subsystems.

In an alternative embodiment, the emergency settings module 323, preconfigured scenarios module 330, and the SSV controller module 310, independently determine (without involving the mode detector 342) whether their respective sets of configuration settings should be applied. If the emergency monitor detects an emergency condition, the emergency configuration settings take priority and are selected by the input arbiter 343 over the configuration settings provided by the SSV controller 310 and the preconfigured scenarios module 330. If no emergency condition is detected and a preconfigured scenario is detected, then the set of configuration settings provided by the preconfigured scenarios module 330 is selected over any configuration settings provided by the SSV controller 310. If no emergency condition or preconfigured scenario is detected, then the SSV controller generates the selected configuration settings 354.

The use of the SSV controller 310, emergency settings module 323, and preconfigured scenarios module 330 in each of the distributed subsystem control modules 212-231 for managing the heterogeneous hardware in processing unit 104 results in a control system in which guarantees can be obtained for the convergence of monitored outputs with their targets, the optimality of the resulting state, the stability of that resulting state, and robustness of the control system in maintaining the previous guarantees in the presence of uncertainty associated with other control modules within and outside the subsystem.

Figure 4:
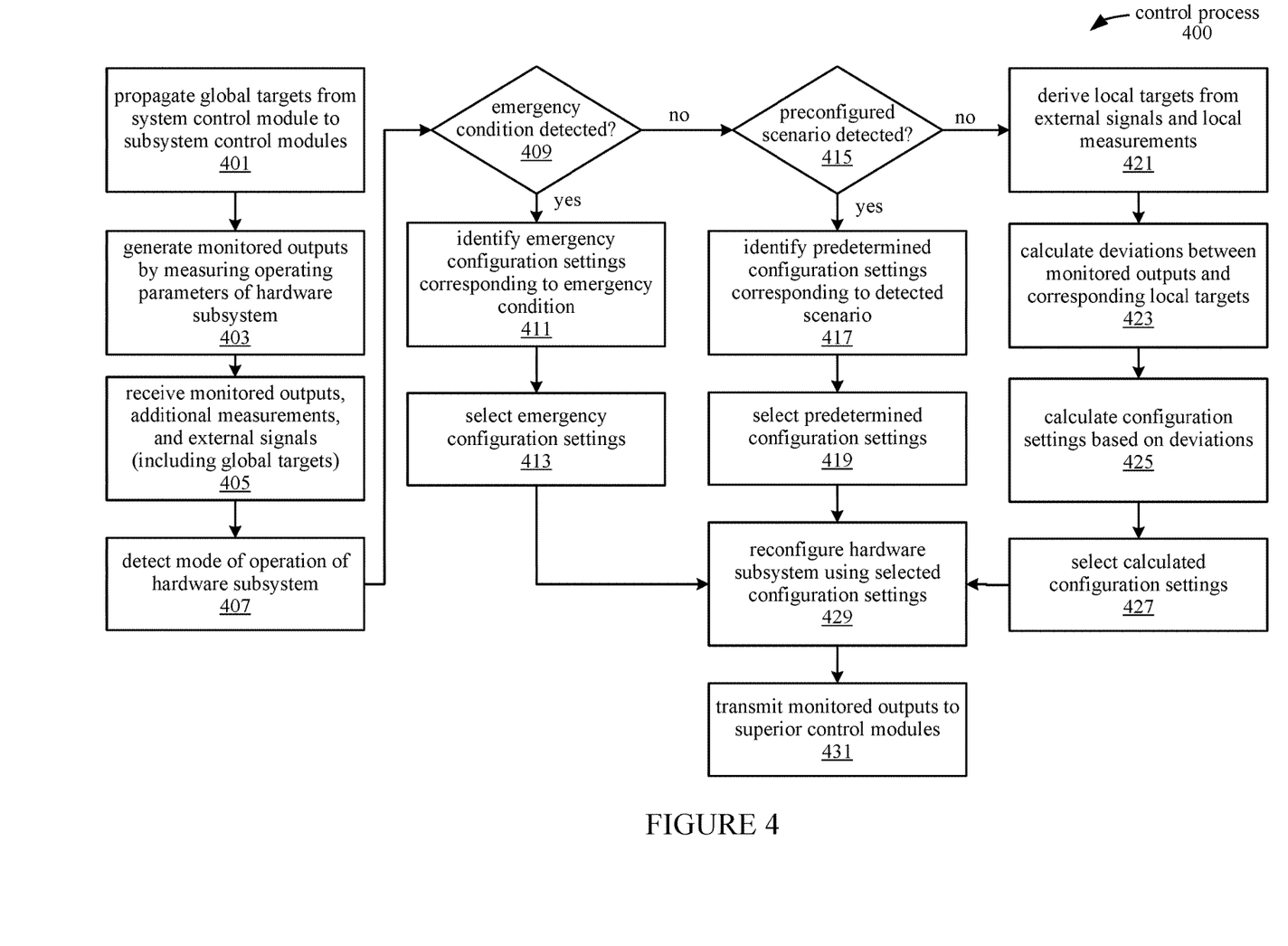
FIG. 4 is a flow diagram illustrating a process for controlling hardware subsystems in a processing unit, according to an embodiment.

FIG. 4 illustrates a process 400 for controlling hardware subsystems in a processing unit 104. The various operations in the control process 400 are performed by different components in the processing unit 104. In one embodiment, the operations of process 400 that are performed in a subsystem control module (e.g., subsystem control module 211) are performed in each of the subsystem control modules (e.g., 211-214) in the processing unit 104, while operations performed in a system control module (e.g., system control module 221) are performed in more than one of the system control modules 221-231 in the processing unit 104.

At block 401, each of the system control modules 231 connected in the hierarchical topology propagates global targets to the subordinate subsystem control modules 211-214 in the hierarchy. Each of the system control modules 221, 222, and 231 transmits one or more global targets to another system control module and/or to one of the subsystem control modules 211-214. System control module 231 transmits global targets to the system control modules 221, which in turn transmit the global targets to the subsystem control modules 211-214 to which they are connected. In one embodiment, the global targets indicate system-wide goals for operating parameters (e.g., temperature, power consumption, etc.). The global targets are received at each subsystem control module as external signals 351.

At block 403, hardware subsystem 201 generates a set of one or more monitored outputs 352 and transmits the monitored outputs 352 to the subsystem control module 211 to which it is connected. Hardware subsystem 201 generates the monitored output signals 352 by measuring operating parameters such as temperature, power metrics (e.g., power, energy usage, current draw, voltage stability), performance metrics (e.g., instruction throughput, frames per second (FPS), FPS variability, operations per second, requests per second), and/or other metrics in its own circuitry. The hardware subsystem 201 similarly generates additional measurements 353 that are transmitted to the subsystem control module 211.

At block 405, the subsystem control module 211 receives the monitored outputs 352 and the additional measurements 353 from the hardware subsystem 201. The subsystem control module 211 also receives the external signals 351 from other system and subsystem control modules in the hierarchical topology. Based on the received signals, the mode detector 342 detects a mode of operation of the hardware subsystem 201, as provided at block 407. A set of configuration settings 354 is selected by the input arbiter 343 based on the detected mode of operation.

At block 409, the mode detector 342 detects an emergency condition, as indicated by the monitored outputs 352 and/or additional measurements 353. At block 411, the emergency settings module 323 identifies a set of emergency configuration settings corresponding to the emergency condition based on the outputs of emergency monitors 321-322. The emergency monitors 321-322 monitor some or all of the monitored outputs 352 to determine which, if any, of the monitored outputs 352 have exceeded their respective hard limits. The emergency settings module 323 provides the identified set of emergency configuration settings to an input of the input arbiter 343. At block 413, the input arbiter 343 selects the provided set of emergency configuration settings as directed by the mode detector 342 in response to detecting the emergency condition.

At block 409, if no emergency condition is detected, the process 400 continues at block 415. At block 415, the mode detector 342 determines whether the hardware subsystem 201 is operating according to a preconfigured scenario. Multiple preconfigured scenarios are each defined by a predetermined pattern of signals. The mode detector 342 detects one of the preconfigured scenarios when the monitored outputs 352 and/or additional measurements 353 match the pattern of signals corresponding to the particular preconfigured scenario. At block 417, the preconfigured scenarios module 330 identifies a set of predetermined configuration settings corresponding to the detected preconfigured scenario and provides the identified set of configuration settings to an input of the input arbiter 343. At block 419, the input arbiter 343 selects the provided set of predetermined configuration settings as directed by the mode detector 342 in response to detecting the preconfigured scenario.

At block 415, if no preconfigured scenario is detected, the process 400 continues at block 421. Since there is no emergency condition or preconfigured scenario, a new set of configuration settings is calculated by the SSV controller 310. Thus, at block 421, the target planner 341 derives local targets 355 from the external signals 351, which include one or more global targets and one or more monitored outputs received from other subsystem control modules. The target planner 341 refines the global targets to generate local targets 355 that are tailored to the hardware subsystem 201 in order to meet the one or more global targets. In one embodiment, the number of global targets received by the target planner 341 is fewer than the number of local targets 355 derived by the target planner 341.

At block 423, deviations 356 between the monitored outputs 352 and corresponding local targets 355 are calculated. In one embodiment, each of the local targets 355 specifies a range or limit for one of the monitored outputs 352. Accordingly, each of the deviations 356 represents a difference between a local target and its corresponding monitored output. At block 425, the SSV controller 310 calculates new configuration settings (i.e., according to Equations 1 and 2) based on the deviations 356. The SSV controller 310 provides the configuration settings to an input of the input arbiter 343. At block 427, the input arbiter 343 selects the provided set of configuration settings as directed by the mode detector 342.

At block 429, the selected configuration settings 354 (which, depending on the outcomes of blocks 409 and 415, could be the set of emergency configuration settings provided by the emergency settings module 323, the predetermined configuration settings for a preconfigured scenario, or configuration settings calculated by the SSV controller 310) are transmitted to the hardware subsystem 201, and the hardware subsystem 201 is thus reconfigured for operation according to the configuration settings 354. The configuration settings 354 change operating parameters for the hardware subsystem including one or more of an operating frequency, an operating voltage, a power state of the hardware subsystem 201 or of components of the hardware subsystem 201, etc.

The reconfiguration of the hardware subsystem 201 results in changes to the monitored outputs 352. The subsystem control module 211 transmits one or more of the updated monitored outputs 352 to system control modules (e.g., 221, 231) that are superior to the subsystem control module 211 in the hierarchical topology. In one embodiment, the updated monitored outputs 352 are also transmitted laterally to other subsystem control modules (e.g., 212) at the same level in the hierarchy. In situations where the operating parameters of one hardware subsystem affect the operation of another hardware subsystem, the updated monitored outputs 352 are used by other control modules to meet targets in affected hardware subsystems.

From block 431, the process 400 continues back to block 401. The process 400 thus repeats to continually provide updated global and local targets, monitored outputs, and additional measurements to the system and subsystem control modules in the processing unit 104. By the continued operation of process 400, the hierarchical distributed control system is able to converge on optimal configurations of the hardware subsystems 201-204 for meeting system-wide global targets, while efficiently handling emergency conditions and known preconfigured scenarios.

A processing unit 104 includes a plurality of subsystem control modules 211-214, where, for each subsystem control module 211 of the plurality of subsystem control modules 211-214: the subsystem control module 211 includes a set of one or more inputs configured to receive a set of one or more external signals 351 and a set of one or more monitored outputs 352 from a hardware subsystem 201 corresponding to the subsystem control module 211, and a set of configuration outputs for controlling one or more configuration settings 354 of the hardware subsystem 201; and the subsystem control module 211 is configured to determine the one or more configuration settings 354 based on the set of monitored outputs 352 and of one or more targets 355 derived from the set of external signals 351.

In the processing unit 104, for each subsystem control module of the plurality of subsystem control modules 211-214, the subsystem control module further includes a target planner module 341 configured to derive the one or more targets 355 from the set of external signals 351, where the set of external signals 351 includes one or more global targets and another set of monitored outputs 352 from other subsystem control modules of the plurality of subsystem control modules 211-214.

In the processing unit 104, for each subsystem control module 211 of the plurality of subsystem control modules 211-214, the number of global targets in the received set of external signals 351 is fewer than or equal to the number of targets 355 derived by the target planner module 341 of the subsystem control module 211.

In the processing unit 104, for each subsystem control module of the plurality of subsystem control modules 211-214, the subsystem control module further includes a SSV controller 310 configured to calculate the one or more configuration settings 354 based on a state vector of the SSV controller 310 and a measurement vector, wherein the measurement vector includes the set of monitored outputs 352 and the one or more targets 355, and wherein the state vector is calculated based on a prior state vector and a prior measurement vector.

In the processing unit 104, the plurality of subsystem control modules 211-214 is coupled in a hierarchical topology with one or more system control modules 221-231, where each subsystem control module is subordinate to at least one of the one or more system control modules 221-231 in the hierarchical topology, and each system control module is configured to transmit one or more global targets to at least one of another system control module and one of the plurality of subsystem control modules 211-214.

In the processing unit 104, for at least one subsystem control module 211 of the plurality of subsystem control modules 211-214, the subsystem control module 211 is configured to transmit one or more monitored outputs 352 of the set of monitored outputs 352 to a system control module superior to the subsystem control module 211 in the hierarchical topology.

In the processing unit 104, the configuration settings 354 control one or more of an operating frequency, an operating voltage, and a power state of the hardware subsystem 201; and the set of one or more monitored outputs 352 from the hardware subsystem 201 indicates one or more of a temperature and a performance metric of the hardware subsystem 201.

In the processing unit 104, for each subsystem control module 211 of the plurality of subsystem control modules 211-214, the subsystem control module 211 further includes: a mode detector 342 configured to detect a mode of operation of the hardware subsystem 201; and an input arbiter 343 configured to, based on the detected mode of operation, select the one or more configuration settings 354 from a plurality of sets of configuration settings 354.

In the processing unit 104, for each subsystem control module 211 of the plurality of subsystem control modules 211-214, the subsystem control module 211 further includes an emergency settings module 323 configured to, in response to an emergency condition indicated by one or more monitored outputs 352 of the set of monitored outputs, provide a set of emergency configuration settings of the plurality of sets of configuration settings 354 to the input arbiter 343, where the input arbiter 343 is configured to select the set of emergency configuration settings when the emergency condition is indicated.

In the processing unit 104, each subsystem control module 211 of the plurality of subsystem control modules 211-214 resides on the same integrated circuit substrate as the hardware subsystem 201 corresponding to the subsystem control module 211 and on the same integrated circuit substrate as the other subsystem control modules 212-214 of the plurality of subsystem control modules 211-214.

A method includes, for each subsystem control module 211 of a plurality of subsystem control modules 211-214 in a processing unit 104: receiving a set of one or more external signals 351 and a set of one or more monitored outputs 352 from a hardware subsystem 201 corresponding to the subsystem control module 211; determining one or more configuration settings 354 for the hardware subsystem 201 based on the set of monitored outputs 352 and of one or more targets 355 derived from the set of external signals 351; and configuring the hardware subsystem 201 for operation according to the one or more configuration settings 354.

The method further includes, for each subsystem control module 211 of the plurality of subsystem control modules 211-214, deriving the one or more targets 355 from the set of external signals 351, where the set of external signals 351 includes one or more global targets and one or more monitored outputs 352 received from other subsystem control modules 212-214 of the plurality of subsystem control modules 211-214, and where the number of global targets is fewer than the number of targets 355 derived for the subsystem control module 211.

The method further includes, for each subsystem control module 211 of the plurality of subsystem control modules 211-214, calculating the one or more configuration settings 354 in a SSV controller 310 based on a state vector of the SSV controller 310 and a measurement vector, wherein the measurement vector includes the set of monitored outputs 352 and the one or more targets 355, and wherein the state vector is calculated based on a prior state vector and a prior measurement vector.

The method further includes: for each system control module of one or more system control modules 221-231 coupled in a hierarchical topology with the plurality of subsystem control modules 211-214, transmitting one or more global targets from the system control module to at least one of another system control module in the hierarchical topology and one of the plurality of subsystem control modules 211-214; and for at least one subsystem control module 211 of the plurality of subsystem control modules 211-214, transmitting one or more monitored outputs 352 of the set of monitored outputs 352 from the subsystem control module 211 to system control module 221 superior to the subsystem control module 211 in the hierarchical topology.

The method further includes generating the set of one or more monitored outputs 352 by measuring one or more of a temperature of the hardware subsystem 201, a performance metric of the hardware subsystem 201, where configuring the hardware subsystem 201 for operation according to the one or more configuration settings 354 further includes changing one or more of an operating frequency, an operating voltage, and a power state of the hardware subsystem 201.

The method further includes, for each subsystem control module 211 of the plurality of subsystem control modules 211-214: detecting a mode of operation of the hardware subsystem 201 corresponding to the subsystem control module 211; and based on the detected mode of operation, selecting at an input arbiter 343 the one or more configuration settings 354 from a plurality of sets of configuration settings 354.

The method further includes, for each subsystem control module 211 of the plurality of subsystem control modules 211-214: in response to an emergency condition indicated by one or more monitored outputs 352 of the set of monitored outputs, providing a set of emergency configuration settings to the input arbiter 343; and at the input arbiter 343, selecting the set of emergency configuration settings when the emergency condition is indicated.

A computing system 100 includes: a plurality of hardware subsystems 201-204, where each of the plurality of hardware subsystems 201-204 is configured to operate according to one or more configuration settings 354; a plurality of subsystem control modules 211-214 each coupled with a corresponding one of the plurality of hardware subsystems 201-204, where for each subsystem control module 211 of the plurality of subsystem control modules 211-214, the subsystem control module 211 includes a set of one or more inputs configured to receive a set of one or more external signals 351 and a set of one or more monitored outputs 352 from the hardware subsystem 201 corresponding to the subsystem control module 211, and a set of configuration outputs for controlling the one or more configuration settings 354 of the hardware subsystem 201, and the subsystem control module 211 is configured to determine the one or more configuration settings 354 based on the set of monitored outputs 352 and of one or more local targets 355 derived from the set of external signals 351; and a set of one or more system control modules 221-231 configured to, for each subsystem control module 211 of the plurality of subsystem control modules 211-214, transmit the set of one or more external signals 351 to the subsystem control module 211.

In the computing system 100, the set of system control modules 221-231 is coupled with the plurality of subsystem control modules 211-214 in a hierarchical topology, where each of the plurality of subsystem control modules 211-214 is subordinate to one or more system control modules 221-231 of the set of system control modules 221-231 in the hierarchical topology.

In the computing system 100, for each system control module of the set of system control modules 221-231, transmitting the set of one or more external signals 351 includes transmitting a global target to one or more of: a subordinate system control module of the set of system control modules 221-231, where the subordinate system control module is subordinate to the system control module in the hierarchical topology; and one of the plurality of subsystem control modules 211-214.

In the computing system 100: a first subsystem control module 211 of the plurality of subsystem control modules 211-214 is configured to transmit one or more signals to a second subsystem control module 212 of the plurality of subsystem control modules 211-214; the signals include one or more of a local target and a monitored output of the set of monitored outputs 352 from the hardware subsystem 201 corresponding to the subsystem control module 211; and the first subsystem control module 211 and the second subsystem control module 212 are, in the hierarchical topology, subordinate to the same system control module 221 of the set of system control modules 221-231.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A processing unit, comprising:
a plurality of subsystem control circuit, wherein for each subsystem control circuit of the plurality of subsystem control circuits,
the subsystem control circuit comprises:
a set of one or more inputs configured to receive a set of one or more external signals and a set of one or more monitored outputs from a hardware subsystem corresponding to the subsystem control circuit,
a set of configuration outputs for controlling one or more configuration settings of the hardware subsystem, and
a structured singular value (SSV) controller configured to calculate the one or more configuration settings based on a state vector of the SSV controller and a measurement vector; and
the subsystem control circuit is configured to determine the one or more configuration settings based on the set of monitored outputs and on one or more targets derived from the set of external signals, wherein the set of external signals comprises one or more global targets and another set of monitored outputs of one or more other hardware subsystems received from one or more other subsystem control circuits of the plurality of subsystem control circuits.

2. The processing unit of claim 1, wherein for each subsystem control circuit of the plurality of subsystem control circuits, the subsystem control circuit further comprises a target planner module configured to derive the one or more targets based on the set of external signals.

3. The processing unit of claim 2, wherein for each subsystem control circuit of the plurality of subsystem control circuits, the number of global targets in the received set of external signals is fewer than the number of targets derived by the target planner module of the subsystem control circuit.

4. The processing unit of claim 1, wherein the measurement vector comprises the set of monitored outputs and the one or more targets, and wherein the state vector is calculated based on a prior state vector and a prior measurement vector.

5. The processing unit of claim 1, wherein:
the plurality of subsystem control circuits is coupled in a hierarchical topology with one or more system control circuits, wherein each subsystem control circuit is subordinate to at least one of the one or more system control circuits in the hierarchical topology; and
each system control circuit is configured to transmit one or more global targets to at least one of another system control circuit and one of the plurality of subsystem control circuits.

6. The processing unit of claim 5, wherein for at least one subsystem control circuit of the plurality of subsystem control circuits, the subsystem control circuit is configured to transmit one or more monitored outputs of the set of monitored outputs to a system control circuit superior to the subsystem control circuit in the hierarchical topology.

7. The processing unit of claim 1, wherein:
the configuration settings control one or more of an operating frequency, an operating voltage, and a power state of the hardware subsystem; and
the set of one or more monitored outputs from the hardware subsystem indicates one or more of a temperature, a power metric, and a performance metric of the hardware subsystem.

8. The processing unit of claim 1, wherein for each subsystem control circuit of the plurality of subsystem control circuits, the subsystem control circuit further comprises:
a mode detector configured to detect a mode of operation of the hardware subsystem; and
an input arbiter configured to, based on the detected mode of operation, select the one or more configuration settings from a plurality of sets of configuration settings.

9. The processing unit of claim 8, wherein for each subsystem control circuit of the plurality of subsystem control circuits, the subsystem control circuit further comprises:
an emergency settings module configured to, in response to an emergency condition indicated by one or more monitored outputs of the set of monitored outputs, provide a set of emergency configuration settings of the plurality of sets of configuration settings to the input arbiter, wherein the input arbiter is configured to select the set of emergency configuration settings when the emergency condition is indicated.

10. The processing unit of claim 1, wherein each subsystem control circuit of the plurality of subsystem control circuits resides on the same integrated circuit substrate as the hardware subsystem corresponding to the subsystem control circuit and on the same integrated circuit substrate as the other subsystem control circuits of the plurality of subsystem control circuits.

11. A method, comprising, for each subsystem control circuit of a plurality of subsystem control circuits in a processing unit:
receiving a set of one or more external signals and a set of one or more monitored outputs from a hardware subsystem corresponding to the subsystem control circuit;
determining one or more configuration settings for the hardware subsystem based on the set of monitored outputs and on one or more targets derived from the set of external signals by calculating the one or more configuration settings in a structured singular value (SSV) controller based on a state vector of the SSV controller and a measurement vector, wherein the set of external signals comprises one or more global targets and another set of monitored outputs of one or more other hardware subsystems received from one or more other subsystem control circuits of the plurality of subsystem control circuits; and
configuring the hardware subsystem for operation according to the one or more configuration settings.

12. The method of claim 11, further comprising:
for each subsystem control circuit of the plurality of subsystem control circuits, deriving the one or more targets based on the set of external signals, wherein the set of external signals comprises one or more global targets and one or more monitored outputs received from other subsystem control circuits of the plurality of subsystem control circuits, and wherein the number of global targets is fewer than the number of targets derived for the subsystem control circuit.

13. The method of claim 11, wherein the measurement vector comprises the set of monitored outputs and the one or more targets, and wherein the state vector is calculated based on a prior state vector and a prior measurement vector.

14. The method of claim 11, further comprising:
for each system control circuit of one or more system control circuits coupled in a hierarchical topology with the plurality of subsystem control circuits, transmitting one or more global targets from the system control circuit to at least one of another system control circuit in the hierarchical topology and one of the plurality of subsystem control circuits; and
for at least one subsystem control circuit of the plurality of subsystem control circuits, transmitting one or more monitored outputs of the set of monitored outputs from the subsystem control circuit to a system control module superior to the subsystem control circuit in the hierarchical topology.

15. The method of claim 11, further comprising:
generating the set of one or more monitored outputs by measuring one or more of a temperature, a power metric, and a performance metric of the hardware subsystem, wherein configuring the hardware subsystem for operation according to the one or more configuration settings further comprises changing one or more of an operating frequency, an operating voltage, and a power state of the hardware subsystem.

16. The method of claim 11, further comprising, for each subsystem control circuit of the plurality of subsystem control circuits:
detecting a mode of operation of the hardware subsystem corresponding to the subsystem control circuit; and
based on the detected mode of operation, selecting at an input arbiter the one or more configuration settings from a plurality of sets of configuration settings.

17. The method of claim 16, further comprising, for each subsystem control circuit of the plurality of subsystem control circuits:
in response to an emergency condition indicated by one or more monitored outputs of the set of monitored outputs, providing a set of emergency configuration settings to the input arbiter; and
at the input arbiter, selecting the set of emergency configuration settings when the emergency condition is indicated.

18. A computing system, comprising:
a plurality of hardware subsystems, wherein each of the plurality of hardware subsystems is configured to operate according to one or more configuration settings;
a plurality of subsystem control circuits each coupled with a corresponding one of the plurality of hardware subsystems, wherein for each subsystem control circuit of the plurality of subsystem control circuits, the subsystem control circuit comprises:
a set of one or more inputs configured to receive a set of one or more external signals and a set of one or more monitored outputs from the hardware subsystem corresponding to the subsystem control circuit, a structured singular value (SSV) controller configured to calculate the one or more configuration settings based on a state vector of the SSV controller and a measurement vector, and a set of configuration outputs for controlling the one or more configuration settings of the hardware subsystem, and the subsystem control circuit is configured to determine the one or more configuration settings based on the set of monitored outputs and on one or more local targets derived from the set of external signals, wherein the set of external signals comprises one or more global targets and another set of monitored outputs of one or more other hardware subsystems received from one or more other subsystem control circuits of the plurality of subsystem control circuits; and a set of one or more system control circuits configured to, for each subsystem control circuit of the plurality of subsystem control circuits, transmit the set of one or more external signals to the subsystem control circuit.

19. The computing system of claim 18, wherein the set of system control circuits is coupled with the plurality of subsystem control circuits in a hierarchical topology, wherein each of the plurality of subsystem control circuits is subordinate to one or more system control circuits of the set of system control circuits in the hierarchical topology.

20. The computing system of claim 19, wherein for each system control circuit of the set of system control circuits, transmitting the set of one or more external signals comprises transmitting a global target to one or more of:

a subordinate system control circuit of the set of system control circuits, wherein the subordinate system control circuit is subordinate to the system control circuit in the hierarchical topology; and one of the plurality of subsystem control circuits.

21. The computing system of claim 19, wherein:

a first subsystem control circuit of the plurality of subsystem control circuits is configured to transmit one or more signals to a second subsystem control circuit of the plurality of subsystem control circuits;

the signals comprise one or more of a local target and a monitored output of the set of monitored outputs from the hardware subsystem corresponding to the subsystem control circuit; and the first subsystem control circuit and the second subsystem control circuit are, in the hierarchical topology, subordinate to the same system control circuit of the set of system control circuits.

\* \* \* \* \*